U S008486520B2

(12) United States Patent
Lima et al.

(10) Patent No.: US 8,486,520 B2
(45) Date of Patent: Jul. 16, 2013

(54) THERMAL SPRAY COATING OF POROUS NANOSTRUCTURED CERAMIC FEEDSTOCK

(75) Inventors: Rogerio S. Lima, Boucherville (CA); Basil R. Marple, Boucherville (CA); Christian Moreau, Boucherville (CA)

(73) Assignee: National Research Council of Canada, Ottawa, Ontario (CA)

( * ) Notice: Subject to any disclaimer, the term of this patent is extended or adjusted under 35 U.S.C. 154(b) by 302 days.

(21) Appl. No.: 12/801,650

(22) Filed: Jun. 18, 2010

(65) Prior Publication Data

US 2012/0202678 A1 Aug. 9, 2012

Related U.S. Application Data

(62) Division of application No. 11/785,543, filed on Apr. 18, 2007, now abandoned.

(60) Provisional application No. 60/794,506, filed on Apr. 25, 2006, provisional application No. 60/873,951, filed on Dec. 11, 2006.

(51) Int. Cl.
*C04B 35/48* (2006.01)
*C04B 35/49* (2006.01)
*B32B 5/18* (2006.01)

(52) U.S. Cl.
USPC ............ 428/304.4; 428/315.5; 428/338; 428/702; 501/134; 501/135

(58) Field of Classification Search
None
See application file for complete search history.

(56) References Cited

U.S. PATENT DOCUMENTS

2006/0199024 A1* 9/2006 Lima et al. .................. 428/469

FOREIGN PATENT DOCUMENTS

CA 2499202 9/2006

OTHER PUBLICATIONS

Lima et al, "Spraying characteristics of nanostructred . . . ", Conference Proceedings of the United Thermal Spray Conference, Dusseldorf, Germany, 1999, p. 190-195.
Lima et al, "Correlation between deposition efficiency, hardness and elastic modulus . . . ", Thermal Spray—Surface Engineering via App. Research, 2000, p. 1201-1205.
Gold et al, "Scratch testing and acoustic emission . . . ", Paper #ICF1001074 in Proceedings of the 10th International Conference on Fracture, 2001.
Lima et al, "Materials Properties of nanostructured . . . ", THERMEC'2000—Proceedings Intern. Conference on Processing and Manufacturing of Adv. Mat., 2001, CD ROM.
Lima et al, "Evaluation and Microhardness and Elastic Modulus of Thermally Sprayed Nanostructured . . . ", Surface and Coatings Technology, 2001, vol. 135, p. 166-172.
Shaw et al, "The dependency of microstructure and properties of nanostructured coatings on plasma spray conditions", Surface and Coatings Technology, 2000, vol. 130, p. 1-8.
Chen et al, "Influence of feedstock and spraying paramaters on the depositing efficiency and microhardness of plasma-sprayed . . . ", Materials Letters, 2004 vol. 58, p. 1241-1245.
Written Opinion of the International Examination Authority dated Jul. 26, 2007 for PCT/CA2007/000636 filed Apr. 28, 2007.
International Search Report dated Jul. 26, 2007 for PCT/CA2007/000636 filed Apr. 28, 2007.
Lima et al., "Integrity of Nanostructured Partially Stabilized Zirconia After Plasma Spray Processing", Materials Science and Engineering, vol. A313, p. 75-82, 2001.
Lima et al., "Bimodal Distribution of Mechanical Properties on Plasma Sprayed Nanostructured Partially Stabilized Zirconia", Materials Science and Engineering, vol. A327, p. 224-232, 2002.
Liang et al., "Thermal Shock Resistances of Nanostructured and Conventional Zirconia Coatings Deposited by Atmospheric Plasma Spraying", Surface and Coatings Technology, vol. 197, p. 185-192, 2005.
Chen et al., "Investigation of the Thermomechanical Properties of a Plamsa-Sprayed Nanostructured Zirconia Coating", J. of the European Ceramic Society, vol. 23, p. 1449-1455, 2003.
Wang et al., "Microstructural Feature, Thermal Shock Resistance and Isothermal Oxidation Resistance of Nanostructured Zirconia Coating", Materials Science and Engineering, vol. A424, p. 1-5, 2006.

\* cited by examiner

*Primary Examiner* — David Sample
(74) *Attorney, Agent, or Firm* — Jason Davis (57) ABSTRACT

By engineering thermal spray parameters, such as temperature and velocity, and engineering feedstock powder size and morphology, ceramic coatings may be produced having desired mechanical and thermal properties. The ceramic thermal spray coating may have a microstructure having about 10-80% by cross-sectional area of a particulate phase based on, surface area of the coating, and the particulate phase is uniformly distributed throughout the coating. The particulate phase is an unmelted portion of the thermal sprayed feedstock, which is highly porous and may be produced by agglomerating nanoparticles of the ceramic. Such coatings can be applied as TBCs or as abradable coatings.

18 Claims, 7 Drawing Sheets

THERMAL SPRAY COATING OF POROUS NANOSTRUCTURED CERAMIC FEEDSTOCK

CROSS-REFERENCE TO RELATED APPLICATIONS

This is a division of U.S. patent application Ser. No. 11/785,543 filed Apr. 18, 2007, now abandoned which claims the benefit of U.S. Provisional Applications Ser. No. 60/794,506 filed Apr. 25, 2006 and U.S. Ser. No. 60/873,951 filed Dec. 11, 2006.

FIELD OF THE INVENTION

This invention relates in general to thermal spray coatings, and, in particular, to ceramic thermal spray coatings having porous nanostructured inclusions uniformly distributed throughout.

BACKGROUND OF THE INVENTION

Thermal spray technologies for applying material to surfaces are very well known in the art. Thermal spray coatings can be made from feedstocks of a variety of forms, such as, particulate, suspensions and liquid precursors. When particulate feedstocks are used, typically the particles have diameters varying from 5 to 100 μm. This powder is fed into a thermal spray torch, which has a source of heat. This source of heat can be generated by the combustion of a fuel gas (e.g., acetylene and oxygen) or a plasma gas (e.g., $Ar/H_2$ plasma). The powder particles that tend to melt in the heat source (spray jet) of the thermal spray torch are accelerated (via gas expansion) towards the substrate surface. The molten particles arrive at the substrate surface, where they flatten, cool and solidify forming lamellas or splats. The typical thermal spray microstructure resembles a stack of overlapping splats.

Ceramic materials are known for being hard and stiff. Ceramic thermal spray coatings have been used for many years as anti-wear coatings. Recently, it has been observed that nanostructured ceramic oxide thermal spray coatings exhibit higher wear resistance when compared to their conventional counterparts.

A paper previously published by the applicant (R. S. Lima, A. Kucuk, C. C. Berndt, "Bimodal Distribution of Mechanical Properties on Plasma Sprayed Nanostructured Partially Stabilized Zirconia", *Materials Science & Engineering A*, 327, 2002, p. 224-232) teaches that porous non-molten nanostructured particles can be embedded in coating microstructure when thermal spraying with nanostructured partially stabilized zirconia.

There exists a need for a cost effective, simple method of producing porous ceramic thermal spray coatings for a number of applications; for example, to produce abradable coatings for seals, and thermal barrier coatings (TBCs).

Abradable Coatings

Abradable coatings or seals are used in compressors and combustion chambers of aircraft and land-based gas turbines to decrease clearance between e.g. a stator casing and a rotor blade tip, and hence to increase compressor and combustion chamber efficiency, and decrease fuel consumption. Modern turbines require very small clearances between rotating components (blade tips, labyrinth seals) and the stator case in order to minimize gap losses, and increase efficiency. For this purpose, different types of abradable coatings (seals) are deposited via thermal spray on the stator case to cope with rotor misalignment, thermal and centrifugal dilations, and unbalanced parts. The primary requirement of abradable coatings is to allow the coating to wear away without damaging the blade tip.

Abradable coatings are characterized by a friable structure of carefully selected materials. These coatings are difficult to engineer because they must be at the same time readily abradable and mechanically stable to withstand the harsh operating conditions of a gas turbine. There is a demand from the aerospace and energy industries for the production of turbines that operate at higher temperatures, i.e. temperatures higher than about 1100° C. Operation at higher temperatures translates into higher efficiency, higher economy and less pollution. As a consequence, it is desirable that the abradable coatings also follow this trend, i.e., they are able to operate at higher temperatures.

In order to achieve this goal, two main types of high temperature abradable coatings are currently in use. The first one is based on the combination of a high temperature alloy (CoNiCrAlY), a self-lubricating material (BN) and a polymer (polyester). The metallic alloy provides the oxidation resistance and mechanical integrity at high temperatures. The BN lowers the friction coefficient of the coating and the polyester produces high amounts of porosity (producing a friable structure) after it is burned out of the coating.

The second type of high temperature abradable currently in use is based on a ceramic material ($ZrO_2$-6-8 wt % $Y_2O_3$), BN and polyester. The ceramic material provides the mechanical and chemical integrity at high temperatures. Like the metallic abradable, the BN also lowers the friction coefficient and the polyester also creates a network of porosity in the coating microstructure (after being burned out), therefore making a friable ceramic material.

Despite the success of the current approaches, there are still problems to be solved. For example, when spraying a composite material with very different physical properties, such as CoNiCrAlY and polyester or $ZrO_2$-7 wt % $Y_2O_3$ and polyester, it is very difficult to have consistency in the spraying process, therefore these types of coatings may exhibit homogeneity problems. Further, after coating deposition, the polymer must be burned out of the coating to create porosity. This process takes hours and raises the cost of the process in terms of time and money.

Thermal Barrier Coatings (TBCs)

TBCs are deposited on the surface of metal parts that are routinely subjected to thermal shock (e.g., turbine blades and combustion chambers of aircraft and land based gas turbines, etc.) to decrease heat transfer between e.g. hot gases arising from the combustion of fuel (e.g., kerosene) and the metallic parts. TBCs are normally made of two layers of coatings. The first layer is generally a metallic bond coat (BC), which is deposited directly (via thermal spray) on the metallic surface of the blades and combustion chambers. The BC layer (coating) is usually made of CoNiCrAlY alloys and the typical BC thickness varies from 100 to 200 μm. The main function of the BC is to protect the metallic parts of the turbine against high temperature oxidation and to serve as a support coating or anchor coating for the second layer. The second layer (also known as top coat) deposited (via thermal spray) on the BC layer, is a ceramic coating usually based on zirconia ($ZrO_2$). The typical thickness of the ceramic top coat varies from 250 to 500 μm. The main function of the ceramic top coat, due to its inherent mechanical integrity, stability, low thermal diffusivity/conductivity and chemical resistance up to high temperatures, is to protect the metallic parts of the turbine against the high temperature environment of the combustion of fuel in the turbine engine. With the use of TBCs it is possible to increase the compressor and combustion chamber efficiencies (by burning fuel at higher temperatures) and decrease fuel consumption. Today, most of the aviation and land based gas turbines make use of TBCs.

There is a demand from the aerospace and energy industries for the production of turbines that operate at higher temperatures, i.e., temperatures higher than 1100° C. Operation at such higher temperatures would translate into higher efficiency, high economy and less pollution. New materials such as $La_2Zr_2O_7$, $SrZrO_3$ and BaZrO that are more stable at higher temperatures and present a low thermal conductivity have been proposed recently to address this need but their fracture toughness is lower than zirconia-based TBCs making them more prone to delamination near the BC interface.

In order to provide higher combustion temperatures, it is important to engineer TBCs with lower thermal diffusivity, thermal conductivity and elastic modulus values, when compared to those of the current TBCs. A low elastic modulus of the ceramic topcoat makes it possible to reduce the thermal stresses at the top coat/BC interface arising from the difference in thermal expansion coefficients between the two layers. As the BC is not responsible for the thermal protection performance of the TBC, the ceramic top coat will have to be re-engineered or further developed in order to produce a structure which will lower the thermal transfer from the combustion gases to the metallic parts of the turbine. Moreover, there is always a demand for more reliable TBCs that will last longer and confer a better thermal protection of the metallic substrate in gas turbines as well as in diesel engines, internal combustion engines, and in general any metal surface that is coated for thermal protection.

It has been very, widely established that zirconia-based coatings are not suitable for use as a TBC, principally because zirconia-based coatings are known to sinter and densify in high temperature environments. The smaller the crystal size the faster they sinter. For these reasons the zirconia-based coatings would be expected to become very rigid and would be expected to crack under thermal shock conditions.

It will thus be appreciated that thermal spray coatings have important applications and that a wide variety of thermal, mechanical and chemical properties of coatings may be desired.

SUMMARY OF THE INVENTION

Applicant has discovered that controlling thermal spray deposition parameters, including particle size distribution, and morphology, temperature, and particle velocities, produces nanostructured coatings that have important applications by virtue of a variety of thermal, mechanical and chemical properties, including a high macroscopic abradability, low thermal diffusivity, low thermal conductivity and low elastic modulus. These properties are provided by selection of a composition size and morphology of a ceramic particle and thermal spray parameters used to form the nanostructured coating, with a view to controlling a spatial distribution of porous nanostructured inclusions separated by solidified, non-porous inclusions.

Accordingly a method is provided for producing a coating, the method comprising obtaining a ceramic powder of porous particles, collecting particles from the ceramic powder that have high porosity and selected sizes; and thermal spraying the collected particles while controlling parameters of the thermal spray to impart temperatures and velocities on the collected particles, wherein the selected size, and imparted temperatures and velocities ensure that parts of the collected particles are not melted, whereby a nanostructured coating is produced having a spatial distribution of porous nanostructured inclusions.

Controlling the distribution and amount of porous nanostructured inclusions further permits the abradable coatings to be of a desired resistance to crumbling (fragmentation) permitting application in harsh operating environments and permits control over elasticity modulus properties to permit low thermal stress interfaces with a TBC.

Thus, there is provided an abradable thermal spray coating comprising a ceramic material, the coating having a microstructure comprising about 10-80% by area, based on surface area of a cross-section of the coating, of a particulate phase comprising agglomerated semi-molten nanoparticles of the ceramic material.

There is also provided a thermal barrier coating comprising a ceramic material with a microstructure having about 10-80% by cross-sectional area of porous nanostructured inclusions (semi-molten nanoparticles) distributed uniformly throughout.

Concerning thermal barrier coatings, new materials such as $La_2Zr_2O_7$, $SrZrO_3$ and BaZrO that are more stable at higher temperatures and present a low thermal conductivity have been proposed and may be applied as a top coat over the nanostructured zirconia-yttria coating to help improving the overall stability of the coating system and further lowering its thermal conductivity.

In one particularly preferred embodiment, agglomerated ceramic nanoparticles of $ZrO_2$-7 wt % $Y_2O_3$ thermally sprayed at a temperature of about 2500-2700° C. and a velocity of from about 200 m/s to about 250 m/s advantageously provides a nanostructured coating having about 30-35% by area of particulate phase based on surface area of a cross-section of the nanostructured coating.

Further features of the invention will be described or will become apparent in the course of the following detailed description.

BRIEF DESCRIPTION OF THE DRAWINGS

In order that the invention may be more clearly understood, a preferred embodiment thereof will now be described in detail by way of example, with reference to the accompanying drawings, in which.

DESCRIPTION OF PREFERRED EMBODIMENTS

The present invention is directed to thermal sprayed ceramic nanostructured coatings that have porous nanostructured inclusions uniformly distributed throughout. By controlling feedstock and thermal spray parameters Applicant has produced a distribution of the porous nanostructured inclusions that results in nanostructured coatings that have desirable thermal, and mechanical macroscopic characteristics. For example, controlling the distribution of porous nanostructured inclusions further permits the abradable coatings to be of a desired resistance to crumbling (fragmenting) permitting application in harsh operating environments and permits control over elasticity modulus properties to permit low thermal stress interfaces with a TBC.

Thermal spray coatings according to the invention are produced from agglomerated ceramic nanoparticles, which may be composed of any ceramic nanoparticles that can be agglomerated into particles suitable for thermal spray coating and provide the desired porosity. The ceramic nanoparticles may be made of zirconium oxide, such as zirconium oxide stabilized by another metal oxide. Zirconium oxide stabilized by yttrium oxide is particularly preferred. Yttrium oxide stabilized zirconium oxide has a general formula of $ZrO_2$-x wt % $Y_2O_3$, where x is preferably about 5-20 wt %, more preferably about 6-8 wt %. Zirconium oxide may be alternatively stabilized by calcium oxide, or magnesium oxide, and may further comprise cerium oxide, titanium oxide or other materials as stabilizers. Any of the zirconium oxides used may have small amounts of different materials, for example, $Al_2O_3$, $SiO_2$ and $Dy_2O_3$ (dysprosia).

The agglomerated ceramic nanoparticles are agglomerated to produce a highly porous particle. Preferably the agglomerated ceramic nanoparticles form a porosity network. The bond between the individual ceramic nanoparticles may be rather weak.

Advantageously, the method can produce a nanostructured coating (e.g. abradable coating or thermal barrier coating (TBC)) having desired properties entirely from a single agglomerated ceramic nanoparticles. Alternatively the feedstock could include agglomerated ceramic nanoparticles and other feedstock components.

The ceramic nanoparticles that form the agglomerated ceramic nanoparticles preferably have an average size of from about 2 nm to about 400 nm, more preferably from about 4 nm to about 200 nm, and more preferable still, from 30-130 nm.

It is known to agglomerate ceramic nanoparticles by the process of spray-drying to form microscopic, spherical, porous, agglomerated ceramic nanoparticles. Fortunately the spherical shape of the agglomerates is a natural product of the spray-drying process. The advantage of this shape is that spheres have the highest volume to surface area ratio resulting in a highest fraction of unmelted or partially melted core, and a most easily controlled fraction of unmelted or partially melted to melted material. It will be appreciated that the roundness of the agglomerates is not as important as the porosity for application in this invention.

The distribution of diameters of the agglomerated ceramic nanoparticles used to make the feedstock may, for example, range from 5 μm to 200 μm. The porous agglomerated particles may have a diameter distribution centered at between 50 microns and 130 microns, more preferably between 80 and 120 microns and more preferably 90 to 110 microns. In general, higher diameters of the agglomerated ceramic nanoparticles permit greater density of the porous nanostructured inclusions, but agglomerated ceramic nanoparticles of higher diameters require higher power torches to provide a given deposition efficiency. The foregoing ranges are preferred ranges for zirconium oxide agglomerates, when sprayed using a 35-45 KW plasma spray torch.

Mixtures (blends) of agglomerated ceramic nanoparticles and conventional feedstock particles may also be used to engineer the feedstock to impart known properties of the conventional feedstock particles to the nanostructured coating, such as electrical, magnetic, mechanical, chemical or thermal properties.

For producing abradable coatings, for example, different materials, such as boron nitride (BN), may be added in the agglomerated ceramic nanoparticles to further lower a coefficient of friction of the coating. Furthermore, the addition of a polymer, such as polyester to subsequently be burned out to produce additional porosity in the material in accordance with the techniques known in the art of thermal sprayed abradable coatings, can also be used.

Further examples of conventional feedstock powders that may be added include particles having a lower melting point than that of the agglomerated ceramic nanoparticles to improve deposition efficiency. Such powders may be selected to minimize infiltration of liquid phase into the porous, non-molten portion of the particles, for example, by choosing a particle that melts to produce a high viscosity fluid.

The feedstock including the agglomerated ceramic nanoparticles may potentially be deposited by any thermal spray device known in the art, for example, using a plasma spray, a flame spray torch. Applicant has successfully applied the coating using an air plasma torch.

Thermal spraying in a controlled manner using spray conditions that do not fully melt the agglomerated ceramic nanoparticles, and preferably do not encourage the molten part of the feedstock to infiltrate (via capillary effect) into the network of porosity of the non-molten portion of the particles (porous nanostructured inclusions) is preferred. This may be accomplished by using agglomerated ceramic nanoparticles having relatively large diameters, and imparting a relatively high velocity to the feedstock such that the feedstock has a relatively short dwell time in the plume of the spray torch. The agglomerated ceramic nanoparticles, when deposited, retain unmelted or semi-molten porous cores, resulting in the porous nanostructured inclusions distributed within the coating. They become features of the coating microstructure that can be readily identified by cross-section imaging. Therefore, in addition to the voids that are normally observed in thermally sprayed materials, i.e. coarse pores (formed by the imperfect packing of thermally sprayed particles), and fines pores (located in between two adjacent thermal spray splats), this type of coating exhibits porous nanostructured inclusions that contain a third and new type (or source) of porosity.

It is thought that this extra source of porosity will lower even further the thermal diffusivity, thermal conductivity and elastic modulus values of these top coats, as is advantageous for forming a more efficient, and longer lasting TBC. This unique structure may allow this coating to operate at temperatures higher than those of current TBCs. Furthermore, the uniformity and density of the distribution of porosities throughout the coating microstructure (both across the sprayed surface and throughout the depth of the coating) imparts a desirable level of friability to an abradable coating, for example.

Also, the porous nanostructured inclusions embedded in the nanostructured coating microstructure act as "weak links" for the nanostructured coating making them useful as abradable coatings. During the rubbing of a turbine blade against this type of nanostructured coating, as the porous nanostructured inclusions lower the coating's strength and integrity, the nanostructured coating is easily removed, avoiding major blade wear and consequently forming the seal, or abradable coating.

The nanostructured coating microstructure preferably comprises an amount of about 10-80% by volume of porous nanostructured inclusions, more preferably about 20-45% by area, based on total area of the nanostructured coating (cross-section). Amounts in a range of 30-35% by volume may be particularly readily produced. The amount of porous nanostructured inclusions may be conveniently measured by visual image analysis. Porosity of the nanostructured coating is generally reasonably good, a porosity of 10-50% (as measured by visual image analysis) being typical, although higher porosities may be attainable.

Thermal spraying is a generally known technique in the art. In the present invention, the feedstock of ceramic material is preferably thermally sprayed at a temperature around the average melting point of the ceramic material, for example at a temperature of ±400° C. of the average melting point of the ceramic material. A temperature range of ±200° C. of the average melting point may be particularly preferred. In general the better control over the temperature, the more effectively the distribution and uniformity of the porous inclusions can be controlled. Spraying at lower temperatures encourages the formation of more particulate phase in the coating microstructure (i.e., less particle melting) resulting in a coating with higher amounts of semi-molten particles or higher porosity. However, spraying at temperatures that are too low reduces coating deposition efficiency (i.e. the ratio of feedstock particles that adhere to the surface to those that bounce off the substrate and do not adhere).

During thermal spraying, the ceramic material is preferably sprayed at a velocity of about 50-600 m/s. Velocities in a range of about 150-400 m/s may be particularly desirable. Velocities in a range of about 200-250 m/s are particularly useful in the thermal spray of zirconium oxide-based agglomerated ceramic nanoparticles having a morphology and size as described herein.

First Example

Abradable coating

Figure 1:
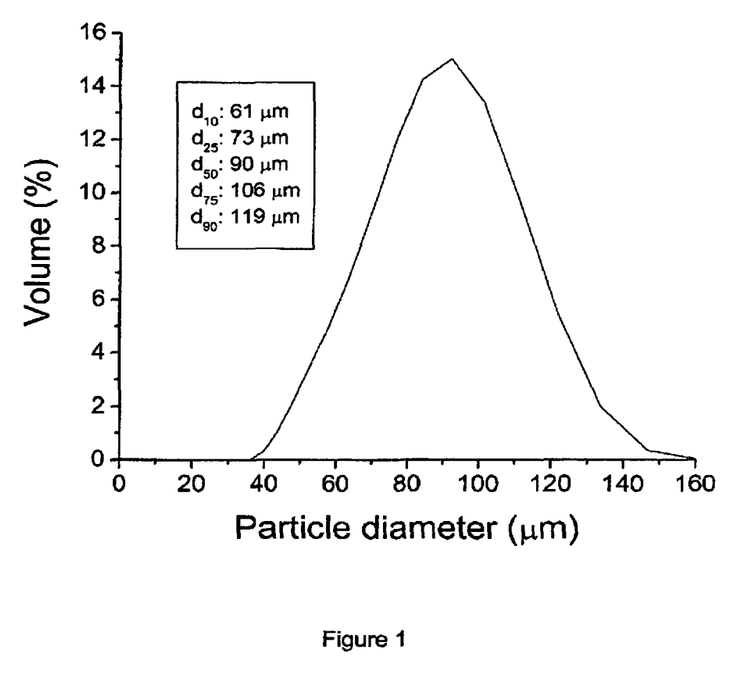
FIG. 1 is a graph of a size distribution of agglomerated ceramic nanoparticles used as a feedstock.
Figure 2A:
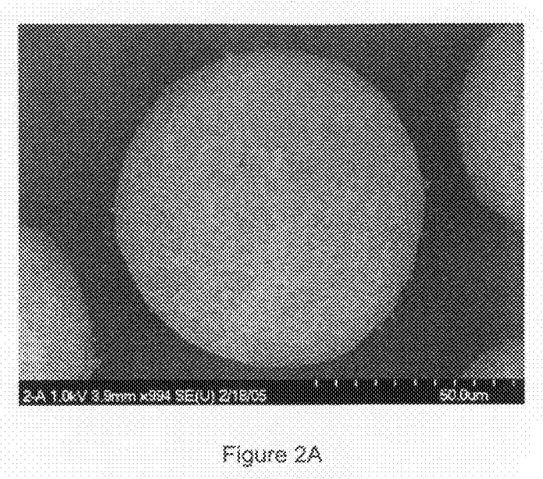
FIG. 2A is a photomicrograph of a typical zirconia-yttria agglomerated ceramic nanoparticles formed by spray-drying zirconia-yttria nanoparticles for use as a feedstock in accordance with the present invention.
Figure 2B:
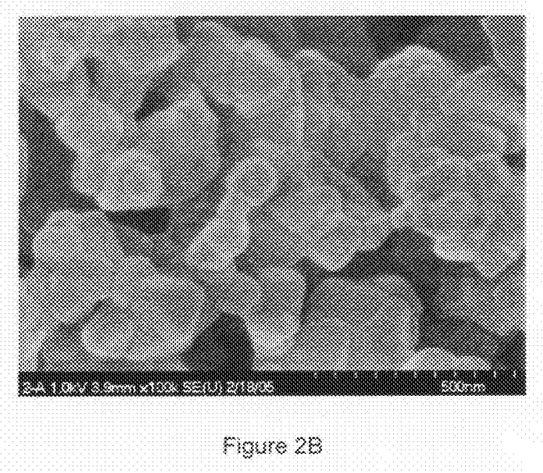
FIG. 2B is a view of the agglomerated ceramic nanoparticles of FIG. 2A at higher magnification.

Feedstock Powders and Thermal Spraying:

Ceramic abradable coatings (A1), as exemplary embodiments of the invention, were formed from zirconia-yttria ($ZrO_2$-7 wt % $Y_2O_3$) (Nanox™ S4007, Inframat Corp, Farmington, Conn., USA) agglomerated ceramic nanoparticles. The microscopic agglomerates exhibited diameters varying from ~10 to 160 μm. Each microscopic agglomerate was formed by the agglomeration of individual nanosized zirconia-yttria particles via the spray-drying process. Sieving was employed to remove smaller Nanox™ S4007 agglomerates from the initial size distribution to produce a distribution as shown in FIG. 1. The 10-160 μm powder was sieved using a 53 μm (Mesh 270) USA Standard Testing Sieve, in an Alpine Augsburg Vacuum Sifter (Germany) in to order to try to obtain a particle size range of approximately 53-160 μm. Portions of 50 g of powder were sieved for 5 minutes each to produce the desirable particle size distribution, until the desired quantity of powder had been obtained. The diameter distribution of particles used in the feedstock is centered near 90 μm, and is 80% contained between 61 and 119 μm. It was confirmed that this feedstock has strong nanostructural characteristics (individual nanosized particles varying from ~30 to ~130 nm) and high porosity (FIG. 2).

A high temperature, metal-based, abradable coating (A2) (CoNiCrAlY—BN-polyester) (Sulzer Metco 2043, Sulzer Metco, Westbury, N.Y., USA) was employed to serve as a reference for comparison with the ceramic abradable. Feedstock powders were thermally sprayed by using an air plasma spray torch (F4-MB, Sulzer Metco, Westbury, N.Y., USA). Both coatings were deposited on Hastelloy™ X substrates that had been grit-blasted to roughen the surface before spraying.

Prior to deposition, plasma spray velocities and temperatures of the zirconia-yttria particles (for A1) in the spray jet were measured using a diagnostic tool (DPV 2000, Tecnar Automation, Saint Bruno, QC, Canada). The diagnostic tool is based on optical pyrometry and time-of-flight measurements to measure the distribution of particle temperature and velocity in the thermal spray jet. A total of 5000 particles were measured at the centerline of the thermal spray jet, where the particle flow density was the highest. The particle detector was placed at the same spray distance as used when depositing the coatings, i.e., 10 cm from the torch nozzle.

During the spraying process, a cooling system (air jets) was applied to reduce the coating temperature, which was monitored using a pyrometer. The maximum surface temperature was approximately 160° C. for the A1 coatings and 150° C. for the A2 coating. The thicknesses of the coatings varied from 2.3 to 2.5 mm. Two different sets of spray parameters were used to spray the A1 coatings (producing two different coatings: A1-1, A1-2), whereas, one set of spray parameters was employed to spray the A2 coating.

For the A1 coatings, a ~175 μm thick CoNiCrAlY bond coat (Amdry 9951, Sulzer Metco, Westbury, N.Y., USA) had been previously deposited with a air plasma spray (F4-MB, Sulzer Metco, Westbury, N.Y., USA) on the Hastelloy™ X substrates after the grit blasting, as usually done for thermal spray coatings to roughen and promote the mechanical anchoring (adhesion) of the sprayed particles onto the substrate surface.

Heat Treatment for Reference Sample:

The polyester of the feedstock used to form A2 was burned out of the coating (to create porosity) by using the following conditions supplied by Sulzer Metco: (i) ramping up from room temperature to 500° C. at 5° C./min, (ii) soaking at 500° C. for 3.5 hours and (iii) ramping down from 500° C. to room temperature in approximately 2 hours.

Nano and Microstructural Characterizations:

Nanostructural and microstructural features of the agglomerated ceramic nanoparticles feedstock and coatings were evaluated via scanning electron microscopy (SEM). The porosity of the coatings was measured by image analysis. A total of 10 images per coating were evaluated for porosity measurements. The percentage of porous nanostructured inclusion in the microstructures of the coatings was also measured via image analysis. A total of 10 images per coating were evaluated for the determination of the percentage of cross-section area of the porous nanostructured inclusions.

Coating Macroscopic Hardness:

The hardness of the coatings was measured on a HR15Y scale with a 12.7 mm (0.5") WC ball under a 15 kgf load. A total of 5 measurements were taken for each coating.

Rub-Rig Test:

Abradability tests were carried out using a rub-rig, which can simulate operating conditions of typical gas turbine engines. All tests were performed at room temperature according to the conditions described in Table 1. The rub-rig tests were performed under different blade tip speeds and seal incursion rates (conditions A and B) simulating operating conditions of gas turbines. Two tests per condition were evaluated for each coating examined. After rub-rig testing, the volume loss of each coating was measured via optical profilometry. The blade wear was measured by a digital vernier caliper while the seal wear was determined using a dial indicator mounted on a height gauge. During rub-rig testing, a pyrometer (400-1400° C. temperature measuring range) was employed to measure the surface temperature of all abradable coatings tested. As the pyrometer did not register any temperature signal for all tests, it is assumed that the surface temperature for all coatings during rub-rig testing was below 400° C. The rub-rig and facility details can be found in Table 2.

TABLE 1

Rub-Rig Test Conditions for Abradability Evaluations*

| Condition | A | B |
|---|---|---|
| Blade tip speed (m/s) | 310 | 155 |
| Incursion rate (µm/s) | 2.5 | 760 |
| Total incursion (mm) | 1 | 1 |
| Blade material | Inconel 718 ™ | Inconel 718 ™ |

(blade width: 6 mm - blade thickness: 3 mm)

TABLE 2

Rub-Rig and Facility Details

| | |
|---|---|
| Air turbine performance | At 250 SCFM, 150 psig - 8 Hp, 12 in-lbs torque, 40,000 rpm |
| Tip speed | 425 m/s |
| Pyrometer | 400-1400° C. temperature measuring range |
| Horizontal load cell | 50 lbs capacity |
| Vertical load cell | 25 lbs capacity |
| Radial incursion | 2.5 µm/s to 760 µm/s |
| Axial incursion | 5 µm/s to 760 µm/s |
| Heated tests | Up to 760° C. (flat samples) |
| Data acquisition system | Acquisition rates up to 25 Hz |

Nanostructure of the Zirconia-Yttria Feedstock:

Referring to FIG. 2A and FIG. 2B, a typical zirconia-yttria particle is shown. When analyzed at higher magnification (FIG. 2B) it is possible to observe the nanostructured features of the feedstock. Each microscopic feedstock particle was agglomerated by spray-drying of zirconia-yttria nanoparticles, with diameters varying from ~30 to ~130 nm. Therefore it is confirmed that this feedstock exhibited a strong nanostructural character and was porous.

Particle Temperature and Velocity.

Average values (and standard deviations) of surface temperature and velocity of the particles in the spray jet for the A1-1 coatings were 2666±195° C. and 244±65 m/s, respectively. Surface temperatures and velocities in the spray jet for the A1-2 coatings were 2563±174° C. and 208±50 m/s, respectively. As the melting point of $ZrO_2$-7 wt % $Y_2O_3$ is approximately 2700° C., not all particles were fully melted during spraying, i.e., semi-molten particles were also deposited in addition to the fully molten ones. Therefore the original porous nanostructure of the feedstock remained in parts of the coating microstructure, as discussed below.

Figure 3A:
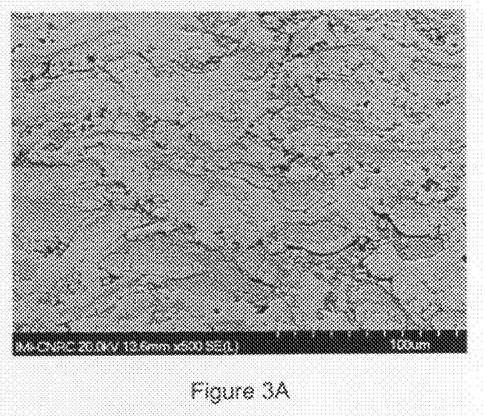
FIG. 3A is a photomicrograph showing a microstructure (cross-section) of a zirconia-yttria nanostructured coating in accordance with an embodiment of the invention.
Figure 3B:
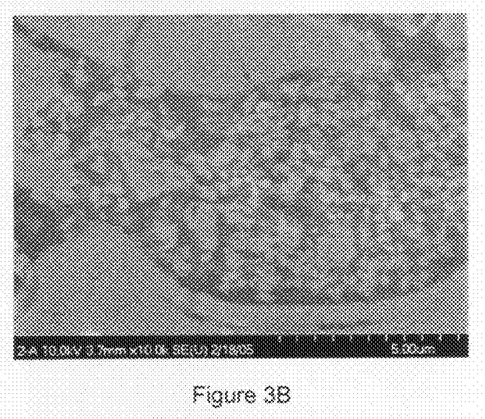
FIG. 3B is a magnified view of a darker region in FIG. 3A.
Figure 3C:
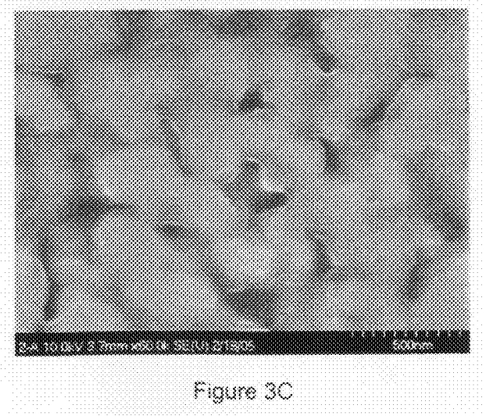
FIG. 3C is a magnified view of FIG. 3B showing the porous nanostructured inclusion in the darker regions.

Microstructural Characterization:

The overall microstructure of coating A1-2 is depicted in FIG. 3A. It is evident that the coatings have a bimodal microstructure represented by lighter and darker regions. When the darker regions are observed at higher magnifications, semi-molten zirconia-yttria nanoparticles are evident (FIGS. 3B,C). The amount of semi-molten zirconia-yttria nanoparticles embedded in the nanostructured coating for A1-1 and A1-2 were found to be 30±2% and 35±3%, respectively, based on total surface area of a cross-section of the coating.

It is evident from the structure of an agglomerate of ceramic nanoparticles (FIG. 2B) that its mechanical integrity is weak. The agglomerate of ceramic nanoparticles is very porous and tiny necks hold the clusters of individual ceramic nanoparticles together. Therefore, if a large quantity of these agglomerated ceramic nanoparticles, in a semi-molten state, are embedded in the nanostructured coating, they will act as weak links for coating integrity. Consequently, this type of coating may be friable, even though it is composed entirely of a ceramic.

Figure 4:
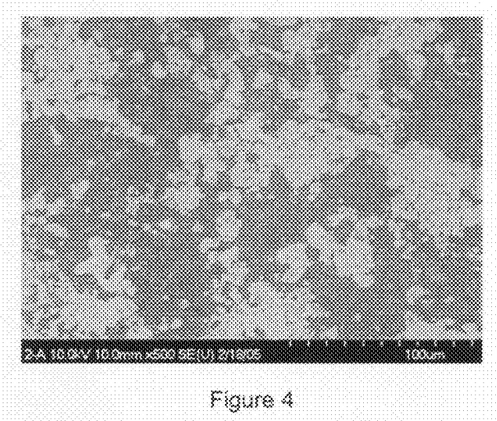
FIG. 4 is a photomicrograph showing a microstructure (cross-section) of prior art high temperature abradable A2.

The microstructure of the A2 coating is shown in FIG. 4. It is evident that that the A2 coating was highly porous, which is necessary to lower the mechanical integrity of the coating in order to increase its abradability properties.

The porosity values for all three coatings evaluated are listed in Table 3. It is important to note that the porosity of A2 is higher than the porosity standardized by the manufacturer (Sulzer Metco), which is 35-45%. Thus A2 as measured is nearly twice as porous as that standardized by the manufacturer. The high porosity values are believed to be the result of non-optimized spray parameters.

TABLE 3

Porosity values measured by image analysis

| Coating | Porosity % (n = 10) |
|---|---|
| A1-1 Nano zirconia-yttria | 15 ± 1 |
| A1-2 Nano zirconia-yttria | 20 ± 1 |
| A2 CoNiCrAlY + BN + polyester | 70 ± 3 |

The feedstock of A1-1 was sprayed at higher values of particle temperature and velocity than those of A1-2. As a consequence, A1-1 exhibited lower amounts of non-molten particles and lower porosity than A1-2, illustrating that feedstock sprayed at lower temperatures and lower velocities leads to more porous coatings.

Coating Hardness:

Values of Rockwell Y hardness of the coatings are listed in Table 4. It is evident that the A1 coatings are much harder than A2. In fact, the A1 coatings are, on average, 4 times harder than the metallic-based abradable.

TABLE 4

Rockwell Y hardness measured with 12.7
mm (0.5") WC ball under 15 kgf load

| Coating | HR15Y (n = 5) |
|---|---|
| A1-1 Nano zirconia-yttria | 87 ± 1 |
| A1-2 Nano zirconia-yttria | 78 ± 2 |
| A2 CoNiCrAlY + BN + polyester | 20 ± 4 |

The hardness of the A2 coating is about three times lower than the hardness standardized by the manufacturer (Sulzer Metco), which is 60-70. The low hardness value like the high porosity are believed to be the result of non-optimized spray parameters. The A2 sample is just used for a "ballpark" comparison or relative reference. As it is softer than a regular abradable, it is thought that if this sample were harder, the performance of the A-1 coatings during rub-rig testing would stand out even more.

Rub-Rig Testing Results:

Rub-rig test results for condition A are listed in Table 5. Condition A represents the test carried out at high blade speed and slow blade incursion. Under these conditions all coatings behaved in a similar way, i.e., there were no significant differences among blade wear, seal wear and volume loss for all the coatings. The blade was virtually intact for all tests.

TABLE 5

Rub-rig test results for condition A (two
tests per condition per coating)*

| Coating | Blade wear (μm) | Seal wear (μm) | Volume loss (mm$^3$) |
|---|---|---|---|
| A1-1 Nano zirconia-yttria | 0 | 1003 | 129 |
| A1-1 Nano zirconia-yttria | 0 | 965 | 120 |
| A1-2 Nano zirconia-yttria | 0 | 1041 | 137 |
| A1-2 Nano zirconia-yttria | 13 | 978 | 126 |
| A2 CoNiCrAlY + BN + polyester | 0 | 965 | 129 |
| A2 CoNiCrAlY + BN + polyester | 0 | 973 | 132 |

Figure 5:
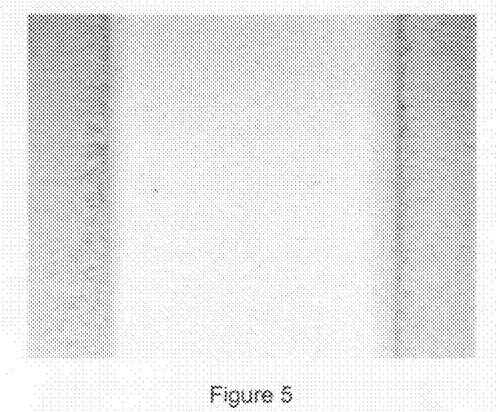
FIG. 5 is a photograph of a wear scar formed during an abradability test (condition A) of nanostructured coating.

A1 coatings did not shatter or chip during the abradability test. FIG. 5 is a photograph of the wear scar of the nanostructured coating sprayed using A1-2. It shows a well-defined and smooth structure. Metallic residues from the metallic blade are not visually apparent. Therefore, this coating is very friable for this test condition.

Rub-rig test results for condition B are listed in Table 6. Condition B represents the test carried out at low blade speed and fast blade incursion.

TABLE 6

Rub-rig test results for condition B (two
tests per condition per coating)*

| Coating | Blade wear (μm) | Seal wear (μm) | Volume loss (mm$^3$) |
|---|---|---|---|
| A1-1 Nano zirconia-yttria | 373 | 622 | 60 |
| A1-1 Nano zirconia-yttria | 381 | 546 | 136 |
| A1-2 Nano zirconia-yttria | 183 | 732 | 76 |
| A1-2 Nano zirconia-yttria | 102 | 762 | 83 |
| A2 CoNiCrAlY + BN + polyester | 0 | 948 | 125 |
| A2 CoNiCrAlY + BN + polyester | 0 | 957 | 140 |

Under these conditions, A2 exhibited the best performance, i.e., it exhibited the lowest blade wear and highest seal wear and volume loss. The A1-1 coating exhibited the lowest abradability, with the highest blade wear and lowest seal wear and volume loss. A1-1 was (i) sprayed with the highest particle velocity and temperature values, (ii) exhibited the lowest amount of non-molten particles embedded in the coating microstructure, (iii) the highest hardness and (iv) the lowest porosity.

However, it must also be stressed that the A2 coatings tested as comparative examples herein contained a much higher level of porosity and were much softer than the metallic-based coatings normally employed in the art. The expected hardness is 60-70, and not 20 as measured. Therefore, it is expected that the differences in wear performance between ceramic coatings of the present invention and the metallic-based coatings normally employed in the art would be greatly reduced for the metallic-based coatings produced using optimized conditions.

Figure 6:
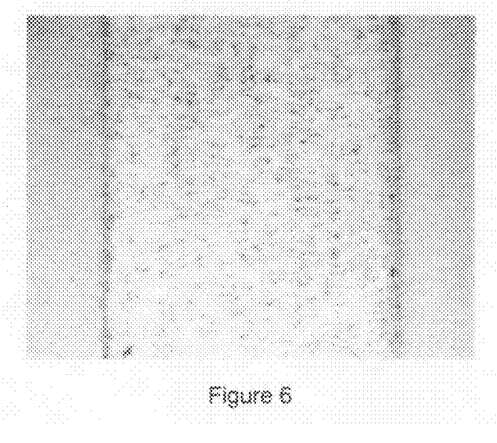
FIG. 6 is a photograph of a wear scar formed during an abradability test (condition B) in the nanostructured coating.

The A1 coatings, despite being not as friable as the metallic-based abradable, exhibited good performance, especially under test condition A. The A1 coatings did not shatter or chip during the abradability test. The wear scars of these coatings are also well-defined, however, metallic residues of the metallic blades on their surfaces can be observed (FIG. 6). On the other hand, the wear scars of the A2 coating were not as smooth as those of the ceramic seal.

Conclusion:

Despite ceramic being generally considered to be hard and stiff, a nanostructured ceramic material can be employed to form abradable coatings with friable structures. By thermal spraying porous agglomerated ceramic nanoparticles such that the feedstock does not completely melt or infiltrate the porosity network of the agglomerated ceramic nanoparticles, ceramic nanostructured coatings with very high friability can be formed by uniformly distributing a relatively high concentration of porous nanostructured inclusions in the coating microstructure.

Under abradability testing using high blade speed and slow blade incursion, there are no significant differences in performance between the nanostructured ceramic A1 and the metallic-based abradable coatings A2, despite the nanostructured ceramic coatings being 4 times harder than the metallic-based abradable.

Under abradability testing using low blade speed and fast blade incursion, the A2 coating exhibited better performance, however, by increasing the volume of non-molten nanostructured ceramic particles embedded in the coating microstructure, it is expected that the ceramic abradables may perform like the metallic abradable under these test conditions.

During all abradability tests, the two ceramic abradables exhibited uniform wear scars without chipping or shattering.

Second Example

TBC

Feedstock Powders and Thermal Spraying:

A ceramic B1 as an embodiment of the invention useful as a top coat of a TBC was formed from agglomerated ceramic nanoparticles ($ZrO_2$-7 wt % $Y_2O_3$) powder (Nanox™ S4007, Inframat Corporation, Farmington, Conn., USA). The nanostructured feedstock powder was thermally sprayed by using an Ar/$H_2$ air plasma spray torch (F4-MB, Sulzer Metco, Westbury, N.Y., USA). The microscopic agglomerates exhibited diameters varying from ~10 to 160 μm. Each microscopic agglomerate was formed by the agglomeration of individual nanosized zirconia-yttria particles via the spray-drying process. Sieving was employed to remove smaller Nanox™ S4007 agglomerates from the initial size distribution to produce a distribution centered substantially shown in FIG. 1. The 10-160 μm powder was sieved using a 53 μm (Mesh 270) USA Standard Testing Sieve, in an Alpine Augsburg Vacuum Sifter (Germany) in to order to try to obtain a particle size range of approximately 53-160 μm. Portions of 50 g of powder were sieved for 5 minutes each to produce the desirable particle size distribution, until the desired quantity of powder had been obtained. The diameter distribution of particles used in the feedstock is centered near 90 μm, and is 80% contained between 61 and 119 μm. It was confirmed that this feedstock has strong nanostructural characteristics (individual nano-sized particles varying from ~30 to ~130 nm) and high porosity (FIG. 2).

For comparison, a conventional top coat B2, representing a widely known top coat currently applied by turbine industries, was deposited from a conventional (i.e. non-porous) zirconia-yttria ($ZrO_2$-8 wt % $Y_2O_3$) powder (Metco 204B-NS, Sulzer Metco, Westbury, N.Y., USA) using an Ar/$H_2$ air plasma spray torch (9-MB (GH nozzle), Sulzer Metco, Westbury, N.Y., USA). Coatings were deposited on metallic substrates (low carbon steel) that had been grit-blasted to roughen the surface before spraying.

Before deposition of the coating, velocities and temperatures of the zirconia-yttria agglomerated ceramic nanoparticles in the plasma spray jet were measured using a diagnostic tool for both the nanostructured and conventional feedstock (Accuraspray, Tecnar Automation, Saint Bruno, QC, Canada). The diagnostic tool is based on optical pyrometry and time-of-flight measurements to measure the distribution of particle temperature and velocity in the thermal spray jet. The particle detector was placed at the same spray distance as used when depositing the coatings, i.e., 10 cm and 11 cm from the torch nozzle for the nanostructured and conventional powders, respectively.

During the spraying process, a cooling system (air jets) was applied to reduce the coating temperature, which was monitored using a pyrometer. The maximum surface temperature was approximately 160° C. for the zirconia-yttria coatings. The thicknesses of the coatings were about ~500 μm.

Nano and Microstructural Characterizations:

Nanostructural and microstructural features of the feedstock and nanostructured coating coatings were evaluated via scanning electron microscopy (SEM). The porosity of both the coatings was measured via image analysis. A total of 10 images per coating were evaluated for porosity measurements. The percentage of non-molten zirconia-yttria agglomerated ceramic nanoparticles embedded in the nanostructured coating was also measured via image analysis, by manually selecting the non-molten inclusions. A total of 10 images per coating were evaluated for the determination of the percentage of non-molten particles.

Thermal Treatment

A thermal treatment (-tt) was performed on B1-tt and B2-tt coatings to determine the effect of temperature on the microstructure, thermal diffusivity and elastic modulus values. The thermal treatment was carried out on free-standing coatings that had been removed from the low carbon steel substrates by dissolving the metal base. The thermal treatment was carried out in a furnace in air by commencing at room temperature and increasing to 1400° C. over a 60-90 min. period. The coatings were left at this temperature for a dwell time of 1, 5 and 20 h. After each period, the samples were removed from the furnace and allowed to cool. Initial cooling was very rapid and, typically, room temperature was reached within 30 min.

Thermal Diffusivity

The thermal diffusivity of as-sprayed and thermally treated coatings was determined by a laser flash method. The measurements were made on coatings that had been removed from the substrate.

Particle Temperature and Velocity

Average values of surface temperature and velocity were 2670° C. and 210 m/s for the agglomerated ceramic nanoparticles and 2700° C. and 148 m/s for the conventional powder. As the melting point of $ZrO_2$-7-8 wt % $Y_2O_3$ is about 2700° C., not all particles were fully molten during spraying, i.e., semi-molten particles were deposited in addition to the molten ones. Therefore, core parts of the original agglomerated ceramic nanoparticles of the feedstock were embedded in the coating microstructure, as discussed below.

Microstructure of the Nanostructured Coating

The nanostructured coating shown in FIGS. 3A-C is representative of the as-sprayed coatings B1 produced by the present example. It is evident that the coating exhibits a bimodal microstructure formed by lighter and darker regions. When the darker regions are observed at higher magnifications, semi-molten agglomerates, resulting from the partial melting of the feedstock particles, are evident (FIGS. 3B,C). This characteristic arises when the molten part of a semi-molten particle does not fully penetrate into its non-molten inner core. The amount of non-molten agglomerates embedded in the coating microstructure was about 35% (based on total surface area of a cross-section of the coating).

It is evident from the microstructure of typical agglomerates (FIGS. 2A,B) that they are very porous, and tiny necks hold the clusters of individual 30-130 nm particles together. Therefore, if a large quantity of these particles, in a semi-molten state, is embedded in the coating microstructure, the overall porosity of the coating will be substantially increased.

Thermal Diffusivity

Figure 7:
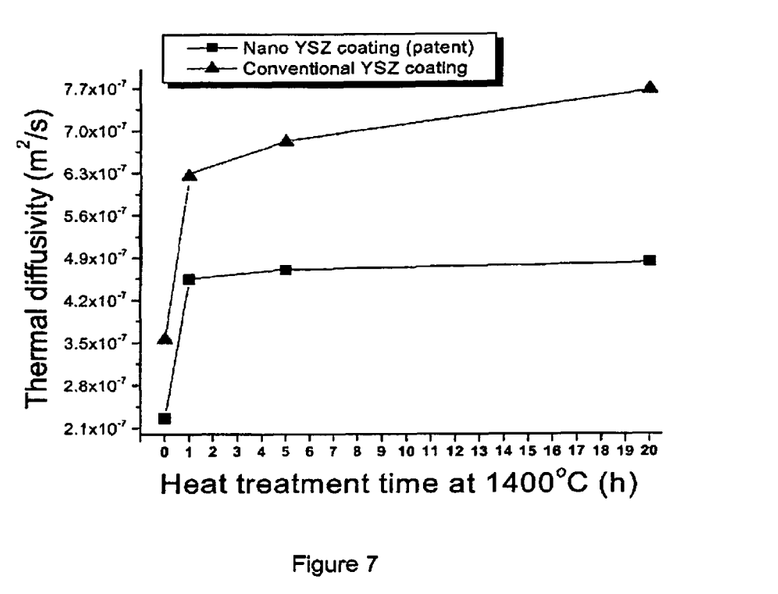
FIG. 7 is a graph showing the effect of the thermal-treatment on thermal diffusivity of nanostructured and conventional zirconia-yttria coatings.

FIG. 7 shows the results of thermal diffusivity at room temperature for as-sprayed (i.e., non thermal-treated-ntt) agglomerated nanostructured (B1-ntt) and conventional zirconia-yttria (B2-ntt) coatings and following thermal treatment (-tt) (B1-tt,B2-tt) at 1400° C. for 1, 5 and 20 h.

The thermal diffusivity of B2-ntt was 57% higher than that of B1-ntt. The thermal diffusivity of B2-tt coating was 59% higher than B1-tt after 20 h of thermal exposure. Therefore, the expected sintering effects of high temperature exposure on the nanostructured coating did not appreciably change the difference-of thermal diffusivity between the two coatings. This phenomenon is counter-intuitive, because according to conventional wisdom in the art nanoparticles of ceramic exhibit higher sintering rates than those of conventional ones. This counter-intuitive phenomenon can be explained based on the following observations (FIG. 8).

Figure 8A:
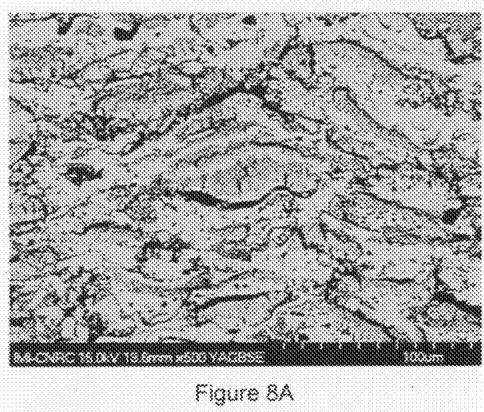
FIGS. 8A,B,C are a photomicrograph images showing a microstructure (cross-section) of a zirconia-yttria nanostructured coating (of FIG. 3) after a heat-treatment at 1400° C. for 1 h, 5 h, and 20 h, respectively.
Figure 8B:
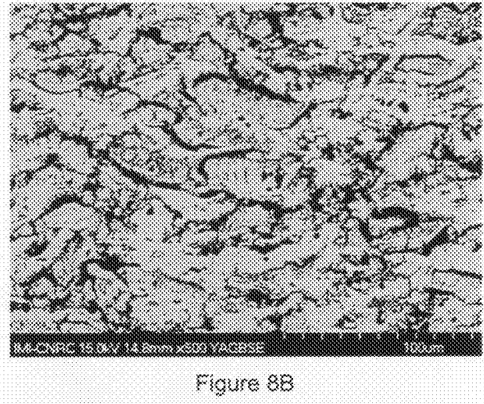
Figure 8C:
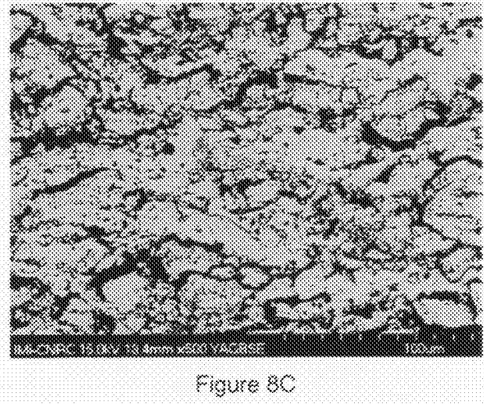

FIG. 8 shows the cross-section of B1, after the heat treatment at 1400° C. for 1 (FIG. 8A), 5 (FIG. 8B) and 20 h (FIG. 8C). By looking at these pictures it is possible to observe that the porosity levels of this ceramic coating increase with sintering time. While not being limited to the following theory in all aspects of the invention, Applicant believes this counter-intuitive phenomenon can be explained by the partial sintering of the semi-molten porous nanostructured inclusions. These semi-molten porous nanostructured inclusions tend to sinter at higher rates than those of the "scaffold" of the coating formed by previously fully molten and resolidified particles, due to the nanostructural character of the inclusions and high temperature effects (1400° C.), and therefore they tend to shrink at higher rates than those of the "scaffold".

As previously described, the porous nanostructured inclusions are surrounded by dense resolidified particles (splats/ lamellas, i.e., the scaffold) that were fully molten in the spray jet. These resolidified particles form shells that surround the semi-molten particles, thereby keeping coating integrity. These dense resolidified particles, due to their morphology and higher density levels, should exhibit lower sintering rates than those exhibited by the porous nanostructured inclusions. As a consequence, the porous nanostructured inclusions, during heat treatment, exhibit higher shrinkage rates than those of the resolidified lamellar structure (scaffold). Consequently, voids are created within the "shells" during heat treatment within the porous nanostructured inclusions, as observed in FIG. 8.

This void creating characteristic is the counter-intuitive phenomenon, which apparently keeps the thermal diffusivity levels of the ceramic coating at lower levels than those of the conventional one even after 20 h of heat treatment at 1400° C.

Figure 9:
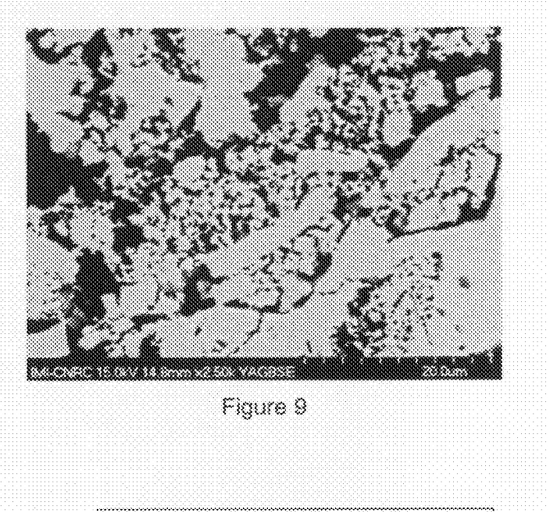
FIG. 9 is a magnified view of FIG. 8C demonstrating that the porous nanostructured inclusion in the darker regions of FIG. 3 shrink (forming a void space) but do not fully densify after a thermal-treatment at 1400° C. for 20 h.

It is important to point out that the heat treatment carried out did not completely densify the inner structure of, the porous nanostructured inclusions. FIG. 9 shows a higher magnification view of the coating previously shown in FIG. 8C, which was heat treated at 1400° C. for 20 h. Even after the heat treatment it is possible to distinguish the porous nanostructured inclusions. The porous nanostructured inclusions that remain help to reduce the thermal diffusivity levels of the ceramic coating, in addition to the interlamellar voids created during heat treatment, also observed in FIG. 9.

Elastic Modulus

Figure 10:
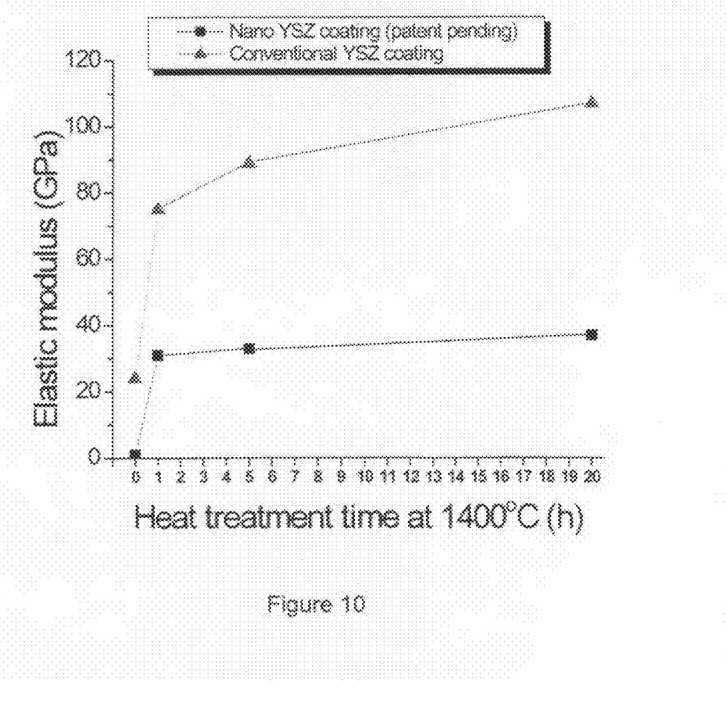
FIG. 10 is a graph showing the effect and evolution of the heat-treatment on the elastic modulus values of nanostructured (of FIG. 3—in accordance with an embodiment of the invention) and conventional zirconia-yttria coatings.

The elastic modulus values of the as-sprayed (non thermal-treated-ntt) and thermal-treated (-tt) nanostructured B1 and conventional B2 coatings were also measured (FIG. 10). The elastic modulus values were measured by laser-ultrasonics.

The elastic modulus values of B2-ntt was higher than that of B1-ntt. The heat treatment did not alter this observation. The elastic modulus value of B2-tt was 290% higher than B1-tt after 20 h of thermal exposure at 1400° C.

Given the dictates of conventional wisdom, it was important to verify these properties of B1. As ceramic coatings (especially nanostructured coatings) are subject to sintering effects that could abruptly increase the stiffness of the material, (i.e., its elastic modulus) lowering its capacity to withstand thermal shocks and variations of shape (volume) that occur when the coating material and its metallic substrate are heated from ambient temperature to operational temperatures (or vice-versa), which can be higher than 1000° C. in gas turbines.

The low values of elastic modulus measured for the B1-ntt and B1-tt coatings are also attributed to the same phenomenon that impeded significant thermal diffusivity increase of this coating, as previously explained. This counter-intuitive characteristic is not only important for the use of this coating as a TBC, but also as a high temperature abradable. These low elastic modulus values may facilitate thicker TBCs with coatings of (e.g., 1 mm) of this material.

It is important to point out that according to conventional wisdom, this type of nanostructured coating would exhibit higher sintering effects (when compared to those of conventional materials) in shorter amount of times when exposed to same high temperature levels, such as, porosity healing and increasing of stiffness (elastic modulus), due to the known enhanced sintering effects caused by the nanoparticles within the porous nanostructured inclusions.

According to conventional wisdom these enhanced sintering effects would tend to increase the thermal diffusivity and elastic modulus values of the nanostructured coating to higher values than those of the conventional ceramic coating. However, by looking at FIGS. 7 and 10 it is observed that the thermal diffusivity and elastic modulus values of the nanostructured coatings tend to stabilize after just 5 h of heat treatment at 1400° C., on the other hand, even after 20 h of heat exposure, the values of these two properties have not shown signs of stabilization in the conventional coating. The results for the conventional coating show that sintering of the zirconia-yttria material is an ongoing process even after 20 h at 1400° C.

The fact that the thermal diffusivity and elastic modulus values of the B1 coatings tend to stabilize after just 5 h of heat exposure at 1400° C. demonstrates that B1 can be considered a so-called "intelligent material", which has an internal mechanism for counteracting the influences of the environment. Traditional materials are normally inert or reactive to the environment in which they operate. Reactive materials generally lose their performance and/or stability by reacting with the environment. For example, materials that are attacked by corrosion.

The nanostructured coatings developed in this study appear to react intelligently to a high temperature environment and react so that differential sintering rates prevent steep continuous growth of thermal diffusivity and elastic modulus values over time. As previously described, the partial densification of the porous nanostructured inclusions (a sintering effect) will lead to void formation within the shells composed of previously fully molten material that surround the porous nanostructured inclusions (FIG. 2). These results are demonstrated in FIGS. 7, 8, 9 and 10. It is important to point out that the scale bars in FIGS. 2A and 8 are parallel to the substrate surface. Therefore, formation of these voids parallel to the substrate surface (FIG. 8), will counter-act the sintering (densification) effects of the porous nanostructured inclusions. In other words, the sintering (densification) of the porous nanostructured inclusions causes a compensation effect, i.e., the formation of horizontal voids (in relation to the substrate surface). The void formation parallel to the substrate surface will tend to lower (i) the heat transfer that goes through thickness, from the environment to the substrate and (ii) the elastic modulus values of the coatings. As an average balance between sintering effects and void formation, these nanostructured coatings will tend to exhibit rapid stabilization of thermal diffusivity and elastic modulus values after a few hours of thermal exposure at high temperatures.

Conclusions

Agglomerated ceramic nanoparticles were thermally sprayed under carefully controlled temperature and velocity conditions, which allowed the engineering of zirconia-yttria nanostructured coatings containing 35% in area of (porous nanostructured inclusions) distributed uniformly throughout the nanostructured coatings.

The agglomerated ceramic nanoparticles are highly porous. The porous nanostructured inclusions contain non-molten porous cores of the agglomerated ceramic nanoparticles that are embedded in the microstructure of the nanostructured coatings where the molten part of the feedstock did not fully penetrate into the non-molten porous core.

The porous nanostructured inclusions are an additional source of porosity within the nanostructured coating. This extra source of porosity helps to lower the thermal diffusivity values of zirconia-yttria coatings to levels not attained by regular conventional zirconia-yttria thermal spray coatings. The presence of the porous nanostructured inclusions in the nanostructured coating also lowers the elastic modulus of the nanostructured coatings, rendering a coating with lower stiffness.

Heat treatment at 1400° C. for 1, 5 and 20 h demonstrated that the nanostructured zirconia-yttria coating exhibited significantly lower values of thermal diffusivity and elastic modulus after 20 h exposure, when compared to those of the conventional zirconia-yttria coating. These phenomena defy conventional wisdom and may be explained based on the partial sintering of the porous nanostructured inclusions, which are surrounded (as a shell) by previously fully molten feedstock that resolidified on the surface during coating formation. The porous nanostructured inclusions partially sinter and shrink, leaving empty voids within the "shells" in the coating structure. Therefore this type of coating may be considered as an "intelligent material", which reacts in an intelligent way to the influences of the environment.

These improved properties make it possible to create a more efficient and reliable ceramic top coat as compared to currently used TBCs. Moreover, this type of coating could be used as an intermediate layer between a base coat and a top coat made of a ceramic material more stable at high temperature.

Other advantages inherent to the structure are obvious to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

What is claimed is:

1. A ceramic coating with a microstructure having about 10-80% by cross-sectional area of porous nanostructured microzones distributed uniformly throughout the ceramic coating being deposited on a surface suitable for deployment at a temperature sufficient to sinter the ceramic.

2. The ceramic coating of claim 1 wherein the microstructure has about 30-50% of the porous nanostructured microzones by cross-sectional area.

3. The ceramic coating of claim 1 wherein the surface is deployed at a temperature over 1000° C.

4. The ceramic coating of claim 1 wherein the ceramic coating comprises a stabilized zirconium oxide.

5. The ceramic coating of claim 1 wherein the ceramic coating consists essentially of a zirconium oxide stabilized by an oxide of yttrium, calcium, magnesium, cerium or titanium.

6. The ceramic coating of claim 1 wherein the ceramic coating consists essentially of a zirconium oxide stabilized by an oxide of yttrium, calcium, magnesium, cerium or titanium, with some alumina, silica or dysprosia.

7. The ceramic coating of claim 1 wherein the coating serves as an abradable.

8. The ceramic coating of claim 1 wherein the coating serves as a thermal barrier coating.

9. A thermal barrier coating comprising a ceramic material with a microstructure having about 10-80% by cross-sectional area of porous nanostructured inclusions distributed uniformly throughout.

10. The thermal barrier coating of claim 9 wherein the microstructure has about 30-50% by cross-sectional area of the porous nanostructured inclusions.

11. The ceramic coating of claim 9 wherein the ceramic coating comprises a stabilized zirconium oxide.

12. The ceramic coating of claim 9 wherein the ceramic coating consists essentially of a zirconium oxide stabilized by an oxide of yttrium, calcium, magnesium, cerium or titanium.

13. The ceramic coating of claim 9 wherein the ceramic coating consists essentially of a zirconium oxide stabilized by an oxide of yttrium, calcium, magnesium, cerium or titanium, with some alumina, silica or dysprosia.

14. An abradable ceramic coating comprising a ceramic material, the coating having a microstructure comprising about 10-50% by area, based on surface area of a cross-section of the coating, of a particulate phase comprising agglomerated ceramic nanoparticles of the ceramic material.

15. The abradable ceramic coating of claim 14 wherein the microstructure has about 30-35% by cross-sectional area of the coating, of the particulate phase comprising agglomerated ceramic nanoparticles of the ceramic material.

16. The ceramic coating of claim 15 wherein the ceramic coating comprises a stabilized zirconium oxide.

17. The ceramic coating of claim 15 wherein the ceramic coating consists essentially of a zirconium oxide stabilized by an oxide of yttrium, calcium, magnesium, cerium or titanium.

18. The ceramic coating of claim 15 wherein the ceramic coating consists essentially of a zirconium oxide stabilized by an oxide of yttrium, calcium, magnesium, cerium or titanium, with some alumina, silica or dysprosia.

* * * * *